(12) United States Patent
Nash

(10) Patent No.: US 6,449,645 B1
(45) Date of Patent: Sep. 10, 2002

(54) SYSTEM FOR MONITORING THE ASSOCIATION OF DIGITIZED INFORMATION HAVING IDENTIFICATION INDICIA WITH MORE THAN ONE OF UNIQUELY IDENTIFIED COMPUTERS IN A NETWORK FOR ILLEGAL USE DETECTION

(76) Inventor: Kenneth L. Nash, 15238 High Springs Dr., Houston, TX (US) 77068-1814

(*) Notice: Subject to any disclaimer, the term of this patent is extended or adjusted under 35 U.S.C. 154(b) by 0 days.

(21) Appl. No.: 09/260,957

(22) Filed: Mar. 2, 1999

Related U.S. Application Data

(60) Provisional application No. 60/116,367, filed on Jan. 19, 1999.

(51) Int. Cl.[7] .............................................. G06F 15/173
(52) U.S. Cl. ........................ 709/224; 709/217; 709/218; 709/219; 709/223; 702/188; 713/200; 713/201; 713/202
(58) Field of Search ................................ 709/223–224, 709/217–219; 713/200–202; 702/188

(56) References Cited

U.S. PATENT DOCUMENTS

| | | | | | |
|---|---|---|---|---|---|
| 5,113,518 | A | * | 5/1992 | Durst, Jr. et al. | 713/200 |
| 5,416,840 | A | * | 5/1995 | Cane et al. | 380/4 |
| 5,652,793 | A | * | 7/1997 | Priem et al. | 380/4 |
| 5,754,864 | A | * | 5/1998 | Hill | 717/11 |
| 5,790,664 | A | * | 8/1998 | Coley et al. | 380/4 |
| 5,796,633 | A | * | 8/1998 | Burgess et al. | 702/187 |
| 6,041,411 | A | * | 3/2000 | Wyatt | 713/200 |
| 6,044,471 | A | * | 3/2000 | Colvin | 713/202 |
| 6,244,758 | B1 | * | 6/2001 | Solymar et al. | 709/224 |

* cited by examiner

Primary Examiner—Zarni Maung
Assistant Examiner—Nabil El-Hady
(74) Attorney, Agent, or Firm—Kenneth L. Nash

(57) ABSTRACT

A system and method for detecting and locating improper or illicit use of digitized information such as illegal pirating, copying, alteration, and the like. The digitized information may include software, digital music, digital movies, multimedia or the like that may be placed on a user's computer and possibly copied to other computers. The system or method preferably operates in the background so as to be unnoticeable to the user and preferably does not interfere with operation of the digitized information even if determined that copying or alteration has occurred. Thus, there is little motivation to remove the routine that effects transmission over the Internet to a server of information such as a program identification indicia, a computer identification indicia, program alteration identification. The computer routine may be installed on the user's computer by many methods and acts to determine and store the information until such time as an Internet connection is made whereupon the information is transmitted to a server for storage. If information received by the server indicates the same program identification on numerous computers then a signal may be provided or produced that would cause further investigation. The system and method may also provide a routine to detect if alterations have been made to the digitized information to be protected.

18 Claims, 4 Drawing Sheets

SYSTEM FOR MONITORING THE ASSOCIATION OF DIGITIZED INFORMATION HAVING IDENTIFICATION INDICIA WITH MORE THAN ONE OF UNIQUELY IDENTIFIED COMPUTERS IN A NETWORK FOR ILLEGAL USE DETECTION

This application claims the benefit of U.S. Provisional Application No. 60/116367, filed Jan. 19, 1999.

BACKGROUND OF THE INVENTION

1. Field of the Invention

The present invention relates generally to an Internet system and, more particularly, to apparatus and methods for compiling copyright/patent/license infringements and violations.

2. Description of the Background

Worldwide software piracy losses are estimated at the present time to typically run well above $10.0 billion dollars annually. Numerous laws discourage and prohibit software piracy such as worldwide copyright and patent laws, the Digital Millennium Copyright Act, the World Intellectual Property Organization Copyright Treaty, and the No Electronic Theft Act. Additionally contract laws creating licenses specify the rights and duties of the parties involved. Music and multimedia piracy losses are not included in the above figures. As well, those figure do not include improper use such as unauthorized alteration of programs.

Methods, systems, and procedures are well known for making software or digitized information more difficult to copy. However, such devices often interfere with the ease of operation and reliability of operation. Reliable software is very important for many applications. Moreover, these methods do not compile evidence or give any indication of the software or digitized information that is copied or altered. Thus, when such methods of preventing copying are circumvented, there is no record or indication that is readily determinable that copying has occurred. As well, there is significant motivation to overcome these copy prevention techniques because the software or other digitized information does not operate when the copy prevention system is triggered. In some cases, the copy prevention system sometimes interferes with program operation, e.g., requires an original cd rom in the cd rom drive.

While the law is generally sufficient for enforcement, and may include rather harsh criminal penalties that depend upon the particular country in which a violation occurs, it is often difficult to locate and find evidence of pirating. If the location and parties could be determined, and the evidence accumulated, then the piracy could be pursued by either civil law or by notification of governmental authorities for criminal prosecution procedures.

While perhaps no measure is 100% foolproof, each system and method has its place and use. It would be desirable to be able to find the location, number of computers, type of violation, and the like. Those skilled in the art have long sought and will appreciate the present invention which addresses these and other problems.

SUMMARY OF THE INVENTION

The copyright/patent/license and/or illegal use monitoring system and method of the present invention are provided to supply evidence of such illegal use. The system and method are passive and do not interfere with operation of the software or other digitized information so that there is little motivation to circumvent operation thereof by one who acts illegally. The system operates worldwide on the Internet and therefore will detect copying/alteration of software/digitized music/digitized movies and the like worldwide. The results are tabulated and are preferably made available to subscribers with respect to the software or digitized information they provide. Thus, those companies can obtain evidence of active piracy. This information can be combined with other information to more specifically determine location, time, and verify the counterfeiting such as by either notifying the suspected parties or turning evidence obtained over to local officials for investigation. In many countries, for instance, copyright violations are criminal so that prosecution would be carried out by officials of the particular country involved.

Thus, it is a presently preferred object of the present invention to provide a method for monitoring whether software or other digitized information has been copied.

These and other objects, features, and advantages of the embodiments of the present invention will become apparent from the drawings, the descriptions given herein, and the appended claims. It will be noted that the above and other described objects, features, and advantages are given for illustration and easier understanding of the invention only for the benefit and illumination of the public who reviews this specification. Any stated objects, features, and advantages are not intended to limit the invention in any manner inconsistent with the claims or other portions of the specification and are not intended to provide limiting language outside of the claim language. Therefore, reference to the claims, specification, drawings and any equivalents thereof is hereby made to more completely describe the invention. It is intended that all alternatives, modifications, and equivalents included within the spirit of the invention and as defined in the appended claims be encompassed as a part of the present invention.

A method is disclosed for use with the Internet for detecting pirating of digitized information in which one embodiment comprises providing a respective first identification indicia that is unique for each of a plurality of substantially identical packets of digitized information. A server is provided in communication with the Internet. A respective second identification indicia that is unique for each of a plurality of computers is determined. The method further comprises automatically determining whether one or more of the plurality of computers is in communication to the Internet. The present invention then includes automatically sending the respective first identification indicia and the respective second identification indicia to the server such that one of the plurality of substantially identical packets of digitized information is associated with one of the plurality of computers. The respective first identification indicia and the second respective indicia are then stored for future use. For instance, it might then be determined if the first identification indicia is associated with more than one of the plurality of computers so as to indicate a possibility that one of the plurality of substantially identical packets of digitized information has been copied. Alternatively or in addition thereto, it might automatically determined whether one of the plurality of substantially identical packets of digitized information has been altered. Alteration information is automatically sent related to whether the one of the plurality of substantially identical packets of digitized information has been altered.

For the case where one or more of the plurality computers is connected to an intranet that includes a plurality of intranet computers, intranet information is stored concerning the first identification indicia and one or more of the plurality of intranet computers, and this intranet information is transmitted to the server. An intranet for this purpose is considered a network of computers outside of the Internet. At some time, it may be determined whether the first identification indicia is associated with more than one of the plurality of intranet computers. To avoid needlessly resending information that has already been sent, preferably it is automatically determined whether the first identification indicia and the respective second identification indicia have already been sent to the server. If the first identification indicia and the respective second identification indicia have already been send to the server, then the step of automatically sending the information is delayed until and if information about the first identification indicia and the respective second identification indicia have changed.

A user of the method may connect to the server from a second location and then obtain the stored information regarding the first identification number and the second identification number. Additional information related to one of the plurality of substantially identical packets of digital information may also be stored such as information obtained when registering software, updating software, from the retail or wholesale sales, and the like. This additional stored additional data may then be associated with the first identification indicia and the second identification indicia to obtain a better picture of the situation.

A detection system for use with the Internet is provided for compiling information related to improper usage of digitized information that, in one embodiment, comprises server in communication with the Internet along with one or more storage units for the server. The digitized information is associated with a first identification indicia that identifies the digitized information as discussed above. A first computer routine is installed in a plurality of host computers. The computer routine is operable for determining a respective second identification indicia for each of the one or more host computers so as to uniquely, identify each of the plurality of host computers, the computer routine being operable for determining when a connection is made with each of the plurality of host computers with the Internet and for automatically transferring the first identification indicia and the respective second identification indicia through the Internet to the server, the server being programmed for receiving and storing in the one or more storage units the first identification indicia and the second identification indicia for each of the one or more host computers, and the first computer routine not affecting other operation of the plurality of host computers with respect to the digitized information. A second computer routine may be provided for determining if the first identification number is associated with more than one of the plurality of host computers. The second routine may be installed in the server to notify the parties involved or may be owned by a subscriber to analyze data from the server.

As another feature of the present invention, the first computer routine which, may have more than one module, determines if the digitized information has been altered. If the digitized information has been altered the first computer routine will then indicate the alteration to the server. While indication of an alteration may be accomplished in several ways, in one embodiment the first computer routine produces a third indicia related to the alteration and transmits the third indicia to the server. The third indicia is preferably stored in the one or more storage units related to the server and is preferably associated with the first identification indicia and the second identification indicia.

Another description/embodiment of the method of the might be characterized as a method for detecting an illegal use of a packet of digitized information. In this case steps include features such as installing a first computer routine in a plurality of computers. It is generally preferable that the first computer routine does not interfere with use of the packet of digitized information. This is preferably true regardless of whether the illegal use is indicated or not. As discussed before a first indicia, such as an identification number or the like, is associated with the packet of digitized information for identifying the packet of digitized information. A second indicia is related to each of the plurality of computers. Obviously, the first and second indicia could be formed of one string of computer symbols, two strings, or a plurality of strings. However the effect is to determine the first and second indicia that are associated as described for determining whether the uniquely identified software is found on more than one computer. Another step involves automatically determining whether one of the plurality of computers is presently in communication with a network of computers, such as might include the Internet or an intranet of computers. When the one of the plurality of computers is presently in communication with the network of computers, which could be the Internet or an intranet or both, then automatically sending the first indicia and the respective second indicia over the network of computers to a second location.

At some time, it will be desirable to determine whether the first indicia is associated with more than one of the plurality of computers. It may also be desirable to determine whether the packet of digitized information has been altered. Once an alteration is detected, when the one of the plurality of computers is presently in communication with the network of computers then the determination of alteration is preferably sent over the network of computers to the second location.

The computer routine that provides the operations discussed above may be provided at least in part in a second program thereby making detection of the computer routine that detects the copying or sends the information related to the copying/alteration of information more difficult. For instance, the computer routine could be provided as part of an Internet browser. Likewise the computer routine could be a routine in an operating system.

The method, as discussed above, also applies to intranets that include a plurality of intranet computers. In this case, intranet information concerning the first identification indicia and one or more of the plurality of intranet computers is stored for transmission.

It is clear that it is improper/illegal to copy in a manner that contradicts copyright and patent laws, or to alter the program against the license that may include a shrink wrap license. Although it may not be necessary, it may be desirable to include within a shrink wrap or other license an agreed upon explicit right, rather than an implied right, to monitor on an extremely limited basis, as discussed herein, wherein monitoring pertains only to copying and/or altering.

While the present invention will be described in connection with presently preferred embodiments, it will be understood that it is not intended that the invention is limited to those particular embodiments but the descriptions given herein merely are to provide sufficient information such that one skilled in the art may practice one or more presently preferred embodiments of the invention, in accord with the patent statutes. Thus, the descriptions of the invention provided herein are not intended to limit the invention in any way. On the contrary, it is intended that all alternatives, modifications, and equivalents included within the spirit of the invention and as defined in the appended claims be encompassed as a part of the present invention.

DETAILED DESCRIPTION OF THE PREFERRED EMBODIMENTS

Figure 1:
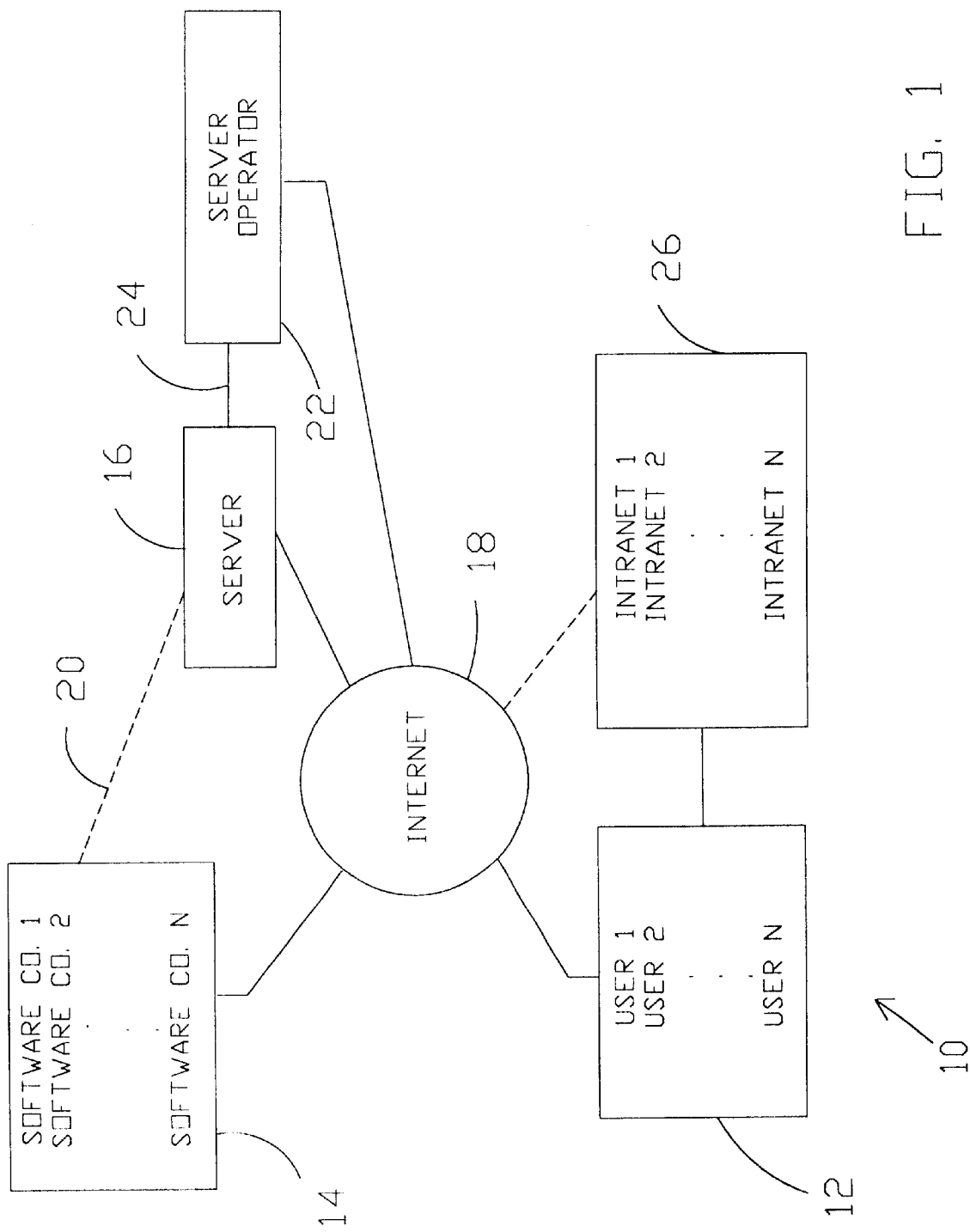
FIG. 1 is a schematic view of a system for operation in accord with the present invention.

Referring now to the drawings, and more particularly to FIG. 1, there is disclosed an overview for system 10 in accord with the present invention for monitoring illegal usage of software or other types of digitized information including music, multimedia, movies and the like. The present system is operable for monitoring copying and/or alteration of the digitized information. The system may monitor an intranet, LAN, or network of local computers for copying onto the computers of the network. Preferably the monitored information is automatically transmitted over the Internet to a server designed to receive and store the monitoring information. The work of the system occurs in the background to the computer user and so is not noticeable. The computer routine that effects the monitoring and transmission from each individual computer may be stored on the software or movies, etc. or it may be contained in whole or part on other software such as browsers/operating systems. This aids in difficulty of detection due to the difficulty of locating the routine. On the other hand, the computer routine may be in both the software and the browser/system so as to increase the likelihood the routine is performed. At any rate, the method of the present invention is preferably purely passive with respect to the software or digitized information used and operates in the background and during pauses in operation so there is little or no motivation to detect and remove the monitoring software.

Figure 3:
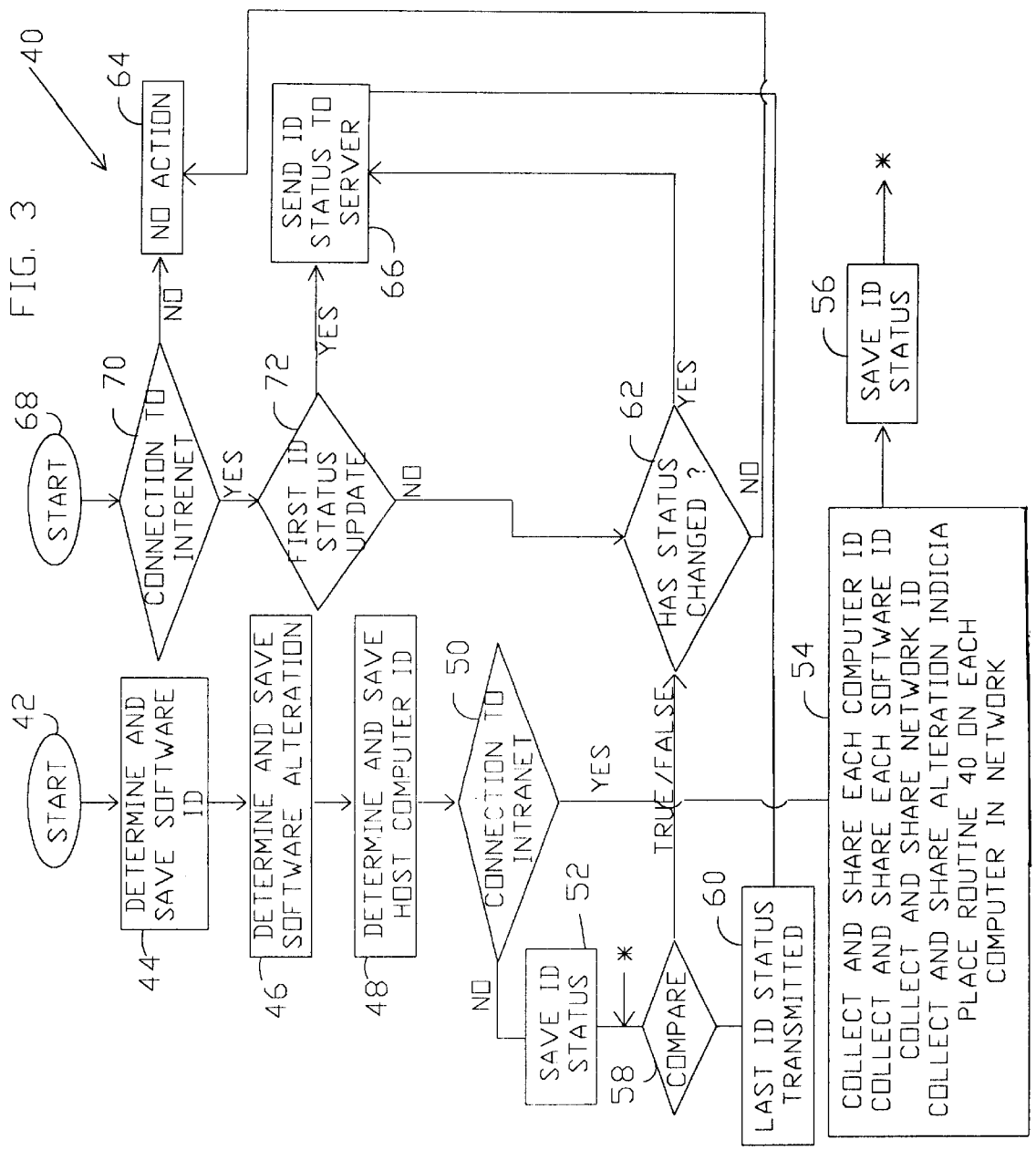
FIG. 3 is a flow diagram for the user operation of FIG. 2 in accord with the present invention.

In system 10, a computer routine for operation of system 10, such as might be similar to that disclosed in the flow chart of FIG. 3, is installed or placed into operation in the computers of a plurality of users as indicated at 12. Users may use any means such as computers or other systems for connecting to the Internet and transmitting the necessary information such that the invention is intended to cover all such means and the word computer is used to mean any such programmable device suitable for accomplishing these functions. The computer routine may be inserted in numerous ways and may actually be inserted more than once, as discussed subsequently. The computer routine monitors for copying of digitized information, such as that produced by one or more software companies as indicated at 14. System 10 in accord with the present invention effectively tallies the number of different computers on which appear a particular software program or other digitized information. If the same program, for instance, appears over one hundred times one might have reason to suspect that a significant pirating of software has occurred. Since this system operates on a worldwide basis, it may detect pirating outside the U.S. Each computer routine, discussed subsequently, for each user computer 12 automatically sends the monitored information over the Internet 18 to server 16. Server 16 includes software for receiving and storing this information. Servers are intended to cover any means for accomplishing these functions and may include distributed and/or multiple systems.

The stored information may be retrieved over the Internet 18 or by a direct line 20. The information may be retrieved at time intervals or upon notification from server 16 due, for instance, from an indication that a significant amount of copying appears to have occurred. Server 16 is preferably maintained by server operator 22 who will have a direct line 24 to server 16 or be able to maintain server 16 over the Internet 18. Server operator 22 may receive compensation for operation from software companies, groups formed to protect from copyright violation, and the like.

In some cases, a user computer as indicated at 12 may also be part of a local area network of computers (LAN) or intranet as indicated at 26 which is referred to herein to be a group of computers networked together other than through an Internet connection. In one embodiment of the present invention, the computers in the LAN or intranet are queried and a determination is made concerning how many computers contain the specific digitized information of concern, whether it appears to be a copy as might be indicated by the same identification indicia, and/or whether it is altered. Each computer in the LAN or intranet would store this information and the next computer connected to the Internet 18 would transmit this information to server 16 as discussed above. There may be numerous LAN's or intranets to which the various individual user computers 12 are connected to.

Figure 2:
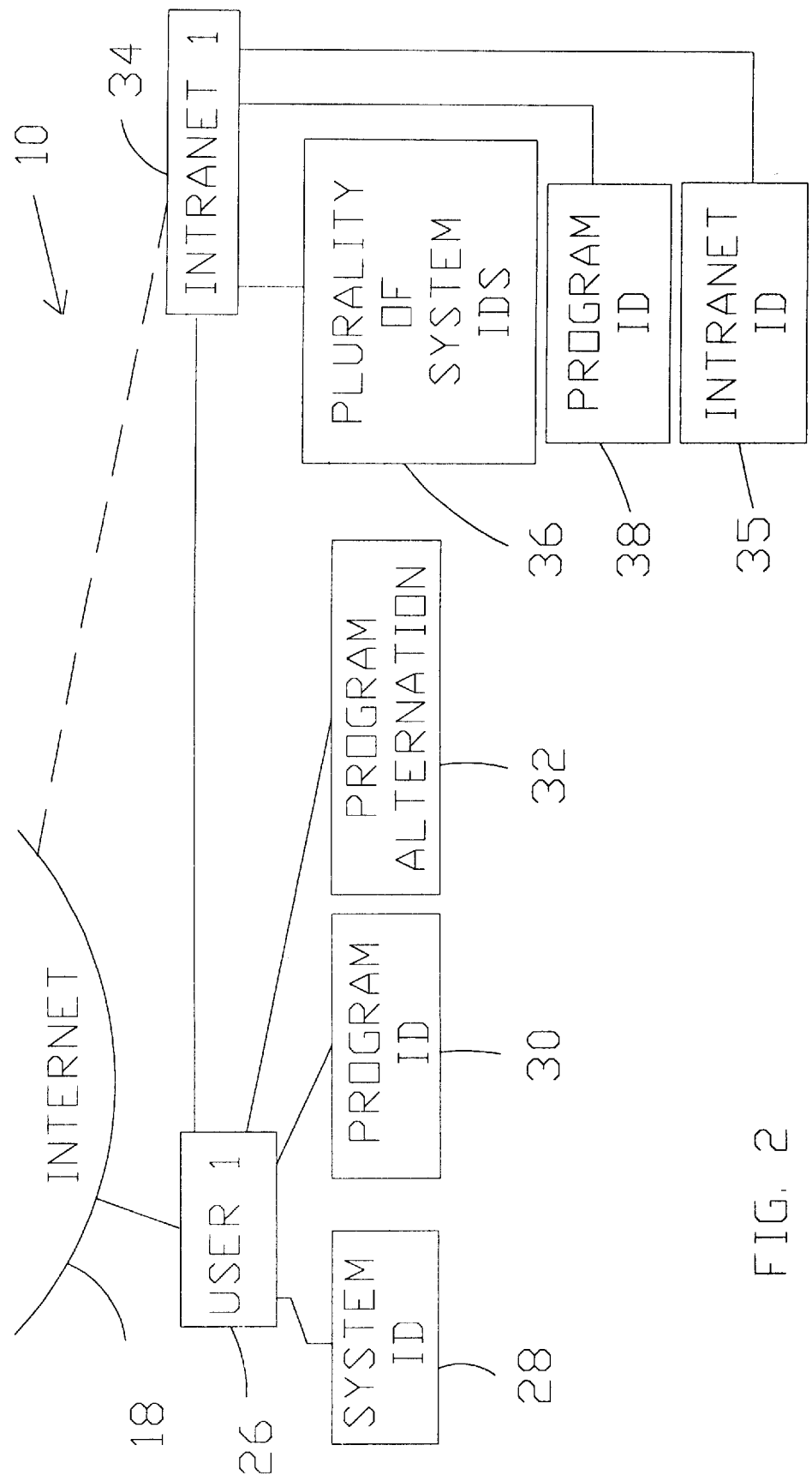
FIG. 2 is a schematic view showing further detail of the user from the system of FIG. 1.

FIG. 2 discloses a few more details of the system of FIG. 1. User computer 26 has installed therein a computer routine, such as that of FIG. 3, that is used to collect data related to copying including a system ID. 28, program ID 30, and program alteration indicia 32. System ID is an indicia related to a specific system and may be generated by the computer routine or using indicia already available. For instance, most storage devices such as hard drives will have an identification number associated therewith. Alternatively, an identification number can be generated and stored for this purpose. The identification number would tend to remain in the hard drive unless it was reformatted—an action that does not normally occur many times. Other means for identifying a particular system or hard drive can be used as is known by those skilled in the art. It is generally desirable to produce a system ID that is not likely to ordinarily change with minor modifications to the system.

Program ID 30 may be contained within the program, software, digitized information or the like which is to be monitored or an identifier could be generated. The general purpose is to establish an identification number that would be transferred to a second computer if the program, software, digitized information or the like were copied. In this way, if numerous different computers each have the digital information with the same associated identification number or indicia, then there is a possibility that copying has occurred. Preferably the identification number is established with creation of the program, software, digitized information or the like. In this way, the program ID can be associated with other information such as wholesale and resale locations, customers, license information, update information, rebate information, and the like as discussed subsequently. If programs that are previously stored have a unique identifier, then the system and method of the present invention can be used to find copying/pirating that occurred prior to installation of the system. The operation can check to see if the program with program ID is present on multiple computers. Thus, the system and method can be used for past and future copying where the requirements of the system are met.

Program alteration information 32 refers to detection of changes in a program. Thus, a check-sum or the like may be run on a program wherein the program ID is already known to determine if the program has been altered. Other means for checking may also be used. Most licenses do not permit alteration of a program so that an indication that alterations have been made could be significant.

Intranet or LAN 34 may also preferably be monitored. The computer routine would determine whether it is part of an intranet and, if so, automatically obtain information about intranet 34 and the computers attached thereto. Generally an intranet will have an intranet ID 35 or identification number associated with it. Alternatively an ID can be generated based on parameters of the system, e.g., the ID numbers of the computers or some portion thereof, already in the system. The intranet will comprise a plurality of computers that give rise to a plurality of computer or system ID numbers 36. Thus, for each protected program with a program ID, a computer ID is associated therewith. This information is preferably stored in each of the computers so that if any computer in the network connects to the Internet 18 then the information involving all computers in intranet 34 will be sent over the Internet 18. This amount of information is relatively small so that disk space used will not be noticeable to the user of the computer.

Numerous methods may be used for installing the computer routine for effecting operation. The most obvious method could be to include it in the digitized information to be copied. Other methods might be to include it with or as an addition to other software such an operating system or browser. The routine might be included in updates, in many different unrelated shareware or freeware programs. If deemed desirable for the situation, the computer software licensee might preferably be apprised/notified by standard wording in the license agreement for agreement of monitoring for copyright/patent unauthorized activity with respect to terms of the license agreement. The computer routine may already exist in the host computer by installation of other programs and simply be turned on by installation of the digitized information to be protected. Thus, there are numerous possibilities for installation and location of the computer routine used to effect storage and transmission of identification information over Internet 18. The point being that although the present program operates in the background so as to be inconspicuous, it may also be hidden if desired to present difficulties to software pirates from discovering, locating, and removing the computer routine.

FIG. 3 describes a possible flow diagram for a computer routine in accord with the present invention for effecting operation of the method. After computer routine 40 is activated, operation begins as indicated at start 42. Activation may occur with installation of software, music, movies, or other digitized information that is to be monitored for copying/alteration. Thus, the first data collection cycle would preferably occur with installation whereupon information would be collected and stored during installing the program. However, this is not required and other triggers might be used. As stated, the computer routine preferably runs in the background. It may be initiated after the computer is idle for a period of time. It may be activated when going online to the Internet or the like. Computer routine may be started at 42 each time the program or information to be protected is activated.

Initial data collection steps include determining and saving a software indicia or identification number or the like as indicated at 44 so as to uniquely distinguish the software or digitized information to be monitored. At this time, a check may be made to determine if the digitized information has been altered as indicated at 46. This may be effected by a checksum or a plurality of checksums over various components of the software. Thus, it might be possible to determine if one or more portions of the software have been altered, if desired. Finally, the method involves determining and saving an indicia or identification number related to the computer in which the routine is operating as indicated at 48. Thus, these three basic factors of information are determined and saved.

The routine then determines, as indicated at 50, whether it is connected to an intranet or LAN, a group of locally interconnected computers. If not, the information already determined has been effectively saved as indicated at 52. If there is a connection to an intranet, then computer routine 40 collects and stores the same information for each computer in the intranet and places the routine on each computer in the intranet as indicated at 54. By placing the routine on each computer in the intranet, the information will be sent to the server by any computer that connects to the Internet. The status or collected information has already been saved now as indicated at 56.

The ID status, or collection of information so far obtained is compared at 58 to the last status that was transmitted by routine 40 to the server as indicated at 60. If the status is identical to that which was previously sent, there is not need to transmit again as this information has already been sent so no action is taken as indicated at 62 and 64. On the other hand, if the ID status has changed, in other words if any information collected has changed including alteration information, identification indicium, or other collected information, then it is desirable to send the new information over the Internet to the server as indicated at 62 and 66.

Start element 68 will preferably begin with a connection to the Internet. For instance, a line may be inserted in any system browsers, Internet service connection programs such as AOL®, CompuServe®, or the like such or other means to start operation of the send cycle. Start element 68 may also instigate start 42 as discussed above, or visa-versa. Once it is determined that connection is made to the Internet as at 70, then a check is made whether information has been sent initially as indicated at 72. If information has never been sent, then the stored information is sent as indicated by the Yes line to item 66. Otherwise, the No line causes routine to determine whether the stored information has changed since the last transmission as discussed in connection with item 62. The above description of the flow chart is provided as a rough guide for illustration purposes and various checks and the like may be desirable for actual implementation. It will be seen that the two start routines, although interrelated, are actions that can be taken at separate times by separate triggers and therefore may be stored at different places.

Figure 4:
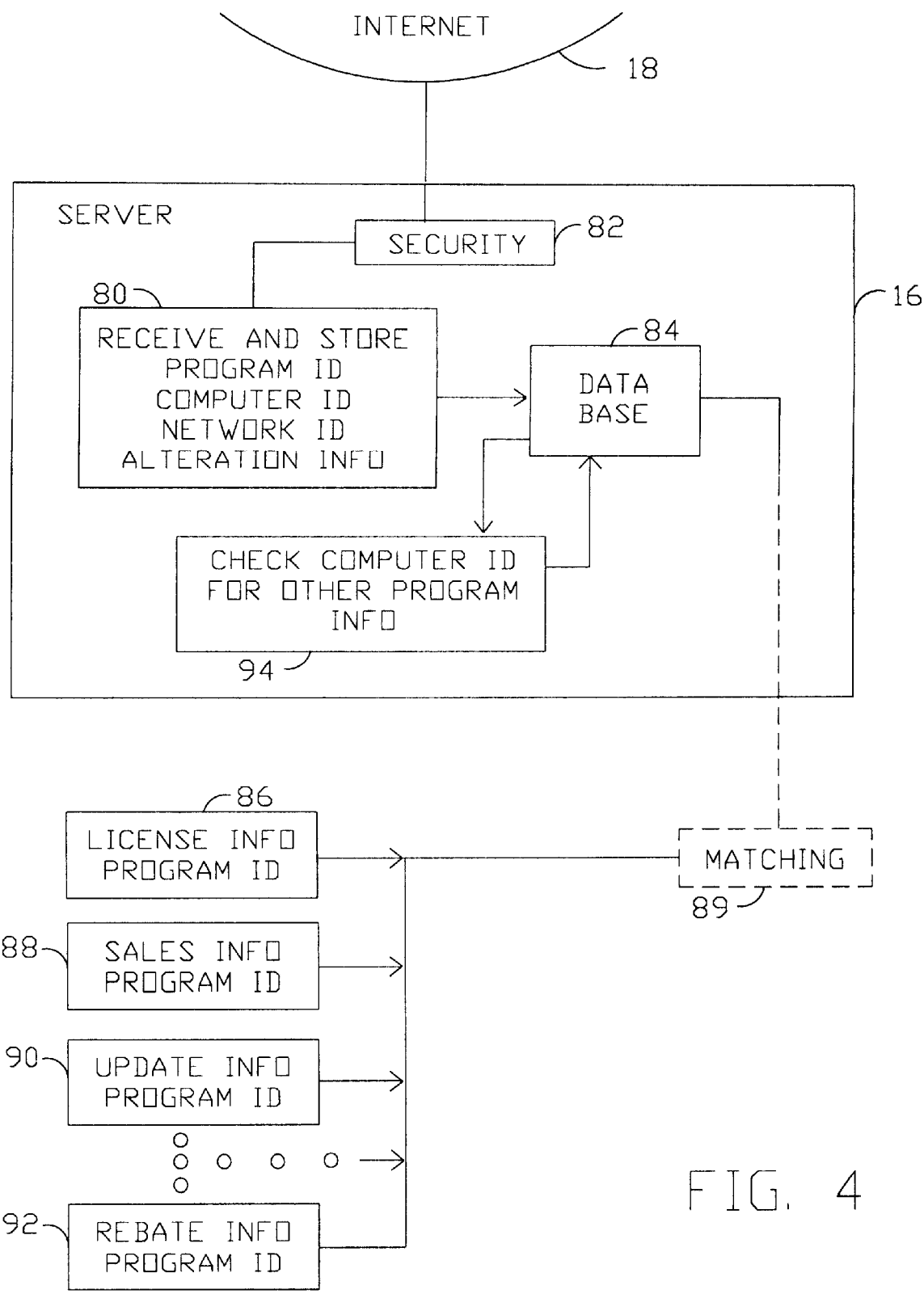
FIG. 4 is a schematic view showing further detail of the server system of FIG. 1.

FIG. 4 discloses a schematic that indicates basic features for a server 16 in accord with the present invention. As discussed previously, server 16 is connected to Internet 18 and receives and stores information as indicated at 80 such as program identification indicia or number, computer identification indicia or number, intranet network identification indicia or number and program alteration information in the manner discussed hereinbefore. Security 82 of a type known to those skilled in the art is used to prevent unauthorized access and retrieval of database information. It may also be used to authenticate transmission if desired if scrambling or coded technology is used as may be desired. Information is preferably stored in database 84 that may be physically located as desired such as within server 16 or not but which is associated with server 16 in that it contains information received by server 16.

Server 16 may be programmed to further enhance the information received or the information may be enhanced outside of server 16. For instance, the program ID may be associated with numerous amounts of information as necessarily to locate the responsible party for improper/illicit use of the digitized information to be protected. For instance, registration and/or license information as indicated at 86 may be combined by matching programming that matches information based on the program identification indicia or number. Other information may also be used such as sales information. More expensive programs are generally sold in transactions that contain user information as indicated at 88. This information is often available in the form of rebates and so forth. Update information, warranty application, or initial turning on of a program may be obtained as indicated at 90. Thus, the user might obtain free updates or even initially start the program or digitized information by supplying relevant matching information. Rebate information to obtain rebates for the digitized information are often used to reduce the cost and thereby supply matching information as indicate at 92. Thus, there are numerous means by which data can be enhanced with matching information that would identify persons responsible are associated with possible illegal pirating or other misuse of digitized information.

This information may be used by matching module 88 with database 84 information within server 16 or matching may be done at other locations by subscribers to a service supplying database 84 information or the like. As another means for providing matching information, the computer ID may be matched with other programs that were to be protected as indicated at 94. If user information is associated with those protected programs, then even if those programs are not misused the information may be associated with protected programs that are misused for identification of the persons responsible.

The above disclosure describes a simple straight forward embodiment of the invention but is not intended and does not prevent patent coverage of the concept with respect to further enhancements of the invention. For instance, computer routine 40 could be modified to receive information from the server as well as send it. For instance, if excessive copying were detected, then server 16 might send a signal to an expanded computer routine 40 that would cause computer routine to search for additional information such as email address, computer phone book information, and other information that might identify the user of the computer on which unauthorized copies appeared to be indicated. Other variations might include determining whether multiple copies of programs exist on the same computer, storage of program id's for many programs, and the like. Variations in methods of collection and variations in types information to be collected and the like may be used in accordance with the goal of the method and system to detect illegal use of digitized information.

The foregoing disclosure and description of the invention is illustrative and explanatory thereof, and it will appreciated by those skilled in the art, that various changes in the operation, location, and architecture as well as in the details of the illustrated embodiments or combinations of features of the elements/steps may be made without departing from the spirit of the invention.

What is claimed is:

1. A method for use with the Internet for detecting pirating of digitized information, comprising:
providing a first identification indicia that is unique for each of a plurality of substantially identical packets of digitized information;
determining a second identification indicia for each of a plurality of computers utilizing one of said plurality of substantially identical packets of digitized information, said second identification indicia is unique for each of said plurality of computers;
automatically determining whether one or more of said plurality of computers is operable for communicating with said Internet;
sending said first identification indicia and said second identification indicia from each of said plurality of computers to one or more servers in communication with said Internet such that each of said plurality of substantially identical packets of digitized information is associated with each of said plurality of computers;
storing said first identification indicia and said second identification indicia in said one or more servers; and
determining if said first identification indicia is associated with more than one of said plurality of computers so as to indicate a possibility that one of said plurality of substantially identical packets of digitized information has been copied.

2. The method of claim 1, further comprising:
automatically determining whether one of said plurality of substantially identical packets of digitized information has been altered, and
automatically sending information related to whether said one of said plurality of substantially identical packets of digitized information has been altered.

3. The method of claim 1, further comprising:
determining whether one of said plurality of computers in connected to an intranet that includes a plurality of intranet computers,
storing intranet information concerning said first identification indicia and one or more of said plurality of intranet computers, and
transmitting said intranet information to said server.

4. The method of claim 3, further comprising:
determining whether said first identification indicia is associated with more than one of said plurality of intranet computers.

5. The method of claim 1, further comprising:
automatically determining whether said first identification indicia and said respective second identification indicia have already been sent to said server.

6. The method of claim 5, further comprising:
when said first identification indicia and said respective second identification indicia have already been send to said server, then delaying said step of automatically sending until said first identification indicia or said respective second identification indicia have changed.

7. The method of claim 1, further comprising:
connecting to said server from a monitoring computer, and
obtaining said stored information regarding said first identification indicia and said second identification indicia with said monitoring computer.

8. The method of claim 1, further comprising:
storing additional information related to one of said plurality of substantially identical packets of digital information to comprise stored additional data; and
relating said stored additional data with said first identification indicia and said second identification indicia.

9. A detection system for use with the Internet for compiling information related to pirating of digitized information, comprising:
one or more servers in communication with said Internet, one or more storage units associated with said one or more servers;

said digitized information being associated with a first identification indicia that identifies said digitized information;

a first computer routine installed in a plurality of host computers utilizing said digitized information, said first computer routine being operable for determining a second identification indicia for each of said one or more host computers so as to uniquely identify each of said plurality of host computers, said first computer routine being operable for automatically transferring said first identification indicia and said second identification indicia through said Internet to said one or more servers, said one or more servers being programmed for receiving and storing in said one or more storage units said first identification indicia and said second identification indicia for each of said one or more host computers, said first computer routine being installed along with at least one of an operating system or an Internet browser of said plurality of host computers; and a second computer routine utilized by said one or more servers for determining if said first identification indicia is associated with more than one of said plurality of host computers.

10. The detection system of claim 9, further comprising:

said first computer routine determining if said digitized information has been altered so as to produce an alteration of said digitized information, if said digitized information has been altered said first computer routine indicating said alteration to said server.

11. The detection system of claim 9, wherein said first computer routine produces a third indicia related to said alteration and transmits said third indicia to said server such that said third indicia is stored in said one or more storage units and is associated with said first identification indicia and said second identification indicia.

12. A method for detecting illegal use of a plurality of substantially identical packets of digitized information, comprising:

installing a first computer routine in each of a plurality of computers, each of said plurality of computers utilizing one of said substantially identical packets of digitized information, said first computer routine not interfering with use of said packet of digitized information;

associating a first indicia with said packet of digitized information for identifying said packet of digitized information;

utilizing said first computer routine for determining a second indicia related to each of said plurality of computers;

when one of said plurality of computers is presently in communication with a network of computers then sending said first indicia and said second indicia over said network of computers to one or more servers;

storing said first indicia and said second indicia in said one or more servers; and utilizing a second computer routine in said one or more servers for determining whether said first indicia is associated with more than one of said plurality of computers.

13. The method of claim 12, further comprising:

determining whether said packet of digitized information has been altered and when said one of said plurality of computers is presently in communication with said network of computers then automatically sending said determination of whether said digitized information has been altered over said network of computers to said second location.

14. The method of claim 1, further comprising:

providing that each of said plurality of packets of digitized information comprise at least one of an Internet browser or an operating system.

15. The method of claim 14, herein:

said each of said packets of digitized information comprises an Internet browser.

16. The method of claim 14, wherein:

said each of said packets of digitized information comprises an operating system.

17. The method of claim 12, further comprising:

determining whether one of said plurality of computers is connected to an intranet that includes a plurality of intranet computers, storing intranet information concerning said first identification indicia and one or more of said plurality of intranet computers, and transmitting said intranet information.

18. The method of claim 12, further comprising:

automatically determining whether one of said plurality of computers is presently in communication with a network of computers.

* * * * *